United States Patent
Idalski et al.

(10) Patent No.: US 11,473,693 B2
(45) Date of Patent: Oct. 18, 2022

(54) PROPORTIONAL HYDRAULIC TWO-STAGE VALVE

(71) Applicant: FEMA Corporation of Michigan, Portage, MI (US)

(72) Inventors: Jason P. Idalski, Portage, MI (US); Andrew Wayne Baker, Portage, MI (US); Steven R. Pride, II, Lawton, MI (US)

(73) Assignee: FEMA Corporation of Michigan, Portage, MI (US)

( * ) Notice: Subject to any disclaimer, the term of this patent is extended or adjusted under 35 U.S.C. 154(b) by 29 days.

(21) Appl. No.: 16/913,279

(22) Filed: Jun. 26, 2020

(65) Prior Publication Data
US 2021/0404576 A1 Dec. 30, 2021

(51) Int. Cl.
*F16K 31/10* (2006.01)
*F16K 31/363* (2006.01)
*F16K 31/06* (2006.01)

(52) U.S. Cl.
CPC .......... *F16K 31/10* (2013.01); *F16K 31/0613* (2013.01); *F16K 31/363* (2013.01)

(58) Field of Classification Search
None
See application file for complete search history.

(56) References Cited

U.S. PATENT DOCUMENTS

| | | |
|---|---|---|
| 3,952,509 A | 4/1976 | Coleman |
| RE29,252 E | 6/1977 | Miller |
| 4,217,968 A | 8/1980 | Dezelan |
| 4,240,457 A | 12/1980 | Riediger |
| 4,412,415 A | 11/1983 | Thomsen et al. |
| 4,663,936 A | 5/1987 | Morgan |
| 4,781,219 A | 11/1988 | Haarstad et al. |
| 4,858,515 A | 8/1989 | Karlberg |
| 4,942,935 A | 7/1990 | Lech |

(Continued)

FOREIGN PATENT DOCUMENTS

| | | |
|---|---|---|
| DE | 3938417 C1 | 3/1991 |
| DE | 102005056039 A1 | 6/2007 |

(Continued)

OTHER PUBLICATIONS

WO-2015028108-A1, machine translation, 2015 (Year: 2015).*

(Continued)

*Primary Examiner* — Daphne M Barry
(74) *Attorney, Agent, or Firm* — Honigman LLP; Douglas H. Siegel

(57) ABSTRACT

A valve includes a solenoid with a chamber housing a pin that actuates when the solenoid is energized. The valve also includes a spool housed within a sleeve. The sleeve includes a supply section with a supply port in communication with a supply source and a tank section with a tank port in communication with a reservoir. The spool includes a body including a first passage receiving fluid from the supply source when an opening for the first passage aligns with the supply port. When the solenoid is energized and the opening for the first passage aligns with the supply port, fluid from the supply source (i) applies a force to the spool body in a direction of actuation by the pin and (ii) flows to a second passage within the valve.

26 Claims, 9 Drawing Sheets

(56) References Cited

U.S. PATENT DOCUMENTS

| | | | |
|---|---|---|---|
| 5,065,793 | A | 11/1991 | Stephenson et al. |
| 5,101,860 | A | 4/1992 | Stephenson |
| 5,129,424 | A | 7/1992 | Stephenson et al. |
| 5,209,317 | A | 5/1993 | Schnelle |
| 5,413,452 | A | 5/1995 | Lech et al. |
| 5,511,457 | A | 4/1996 | Hawkins et al. |
| 5,826,676 | A | 10/1998 | Ko |
| 6,122,912 | A | 9/2000 | Phillips |
| 6,216,806 | B1 | 4/2001 | Toms |
| 6,490,861 | B2 | 12/2002 | Biggi et al. |
| 6,769,348 | B2 | 8/2004 | Hudson et al. |
| 7,343,934 | B2 | 3/2008 | Pride, II et al. |
| 7,610,935 | B2 | 11/2009 | Arbjerg |
| 7,610,988 | B2 | 11/2009 | Porskrog et al. |
| 7,837,001 | B2 | 11/2010 | Young et al. |
| 7,980,354 | B2 | 7/2011 | Thomsen et al. |
| 7,997,379 | B2 | 8/2011 | Kryhlmand et al. |
| 8,079,439 | B2 | 12/2011 | Porskrog et al. |
| 8,167,081 | B2 | 5/2012 | Byrd et al. |
| 8,272,471 | B2 | 9/2012 | Gehlhoff |
| 8,651,225 | B2 | 2/2014 | Cadman et al. |
| 9,101,090 | B2 | 8/2015 | Pierce et al. |
| 9,915,276 | B2 | 3/2018 | Bruck et al. |
| 10,001,147 | B2 | 6/2018 | Kleitsch |
| 10,435,064 | B2 | 10/2019 | Krahn |
| 10,668,947 | B2 | 6/2020 | Eagles |
| 10,960,923 | B2 | 3/2021 | Bergmann |
| 2002/0108802 | A1 | 8/2002 | Draper |
| 2003/0051471 | A1 | 3/2003 | Draper et al. |
| 2003/0163989 | A1 | 9/2003 | Collet et al. |
| 2006/0218909 | A1 | 10/2006 | Khalil et al. |
| 2006/0231147 | A1* | 10/2006 | Pride, II ................. F16K 11/07 137/625.64 |
| 2009/0090882 | A1* | 4/2009 | Reilly ................... F16K 27/048 251/129.15 |
| 2009/0145501 | A1 | 6/2009 | Kiessling et al. |
| 2009/0218161 | A1 | 9/2009 | Cadman et al. |
| 2009/0272598 | A1 | 11/2009 | Gehlhoff |
| 2009/0293976 | A1 | 12/2009 | Stretch |
| 2010/0200090 | A1 | 8/2010 | Sturman |
| 2010/0224434 | A1 | 9/2010 | Perry et al. |
| 2013/0087209 | A1 | 4/2013 | Krahn |
| 2014/0138165 | A1 | 5/2014 | Bebernes et al. |
| 2015/0223386 | A1 | 8/2015 | Nafziger et al. |
| 2016/0288827 | A1 | 10/2016 | Bebernes et al. |
| 2017/0072998 | A1 | 3/2017 | Krahn |
| 2018/0186402 | A1 | 7/2018 | Irie |
| 2018/0328420 | A1 | 11/2018 | Choi et al. |

FOREIGN PATENT DOCUMENTS

| | | | | |
|---|---|---|---|---|
| WO | WO-2015028108 A1 * | 3/2015 | ......... | G05D 16/2024 |
| WO | WO2015028108 A1 | 3/2015 | | |

OTHER PUBLICATIONS

Sep. 28, 2020 International Search Report and Written Opinion for PCT/US20/41395.

Aug. 24, 2020 International Search Report and Written Opinion for PCT/US20/039837.

Feb. 10, 2020 International Search Report and Written Opinion for PCT/US19/56437.

* cited by examiner

PROPORTIONAL HYDRAULIC TWO-STAGE VALVE

TECHNICAL FIELD

This disclosure relates to a proportional hydraulic two-stage valve.

BACKGROUND

Hydraulics typically refers to the use of relatively high density incompressible liquids (i.e. hydraulic fluid) to perform work. Hydraulic systems may use an arrangement of one or more hydraulic circuits to perform this work (e.g., moving an object). A hydraulic circuit generally includes components performing operations based on fluid dynamics. Hydraulic circuits often control fluid flow and therefore fluid pressure to perform work either within the circuit or external to the circuit. A hydraulic circuit may be controlled mechanically and/or electrically (e.g., by electrical signals). Hydraulic valves are mechanical devices that are used to regulate the flow of fluid within a hydraulic circuit; they can be used to close a line, redirect pressurized fluid, or control the level of flow to a certain area.

SUMMARY

One aspect of the disclosure provides a proportional hydraulic two-stage valve. The valve includes a pilot-operated stage including a solenoid, the solenoid includes a solenoid chamber housing a solenoid pin. When the solenoid is energized, the solenoid actuates the solenoid pin. The valve also includes a main stage including a proportional spool housed within a spool sleeve. The spool sleeve includes a supply section with at least one supply port in fluid communication with a hydraulic fluid supply source and a tank section with at least one tank port in fluid communication with a reservoir for the hydraulic fluid. The proportional spool includes a spool body including a first fluid passage receiving hydraulic fluid from the supply source when an opening for the first fluid passage in the spool body aligns with the at least one supply port of the supply section. When the solenoid is energized and the opening for the first fluid passage in the spool body aligns with the at least one supply port of the supply section, hydraulic fluid from the supply source applies a force to the spool body in a direction of actuation by the solenoid pin and flows to a second fluid passage within the pilot-operated stage of the valve. The second fluid passage is in fluid communication with the reservoir for the hydraulic fluid.

Implementations of the disclosure may include one or more of the following optional features. In some implementations, the spool body includes at least one working port along a central axis of the spool body. Here, the spool body may include a chamber along the central axis of the spool body, the chamber may include the at least one working port configured to selectively communicate between the at least one supply port of the supply section and the at least one tank port of the tank section. Optionally, the spool body may include a top surface facing the solenoid pin. Here, when the solenoid is energized and the opening for the first fluid passage in the spool body aligns with the at least one supply port of the supply section, hydraulic fluid from the supply source may apply the force to the spool body against the top surface of the spool body.

In some examples, the valve includes a mechanical linkage between the pilot-operated stage and the main stage, actuation of the solenoid pin couples the solenoid pin with the mechanical linkage to move the spool body within the spool sleeve. Here, the spool body may move within the spool sleeve in the direction of actuation in a first state and a second state. During the first state, the actuation of the solenoid pin may drive the mechanical linkage into the spool body moving the spool body to a first position. During the second state, the spool body may decouple from the mechanical linkage and the force applied to the spool body by the hydraulic fluid flowing through the first fluid passage may move the spool body along the spool sleeve from the first position to a second position further away from the mechanical linkage. The mechanical linkage may include a flow restricting element such as, but not limited to, a ball and an annular seat for the ball. The spool body may include a connecting rod having a diameter less than an inner diameter of the annular seat for the ball. Here, during the first state and the second state, hydraulic fluid flowing through the first fluid passage of the spool body fluidly may communicate with the second fluid passage along a fluid pathway between the connecting rod and the annular seat, and the hydraulic fluid may apply a respective force to the ball to allow the hydraulic fluid to flow between the annular seat and the ball to the second fluid passage. The valve may include a ball chamber housing the ball and the annular seat for the ball, the ball chamber may include at least one aperture at least partially defining the second fluid passage. In some implementations, the tank section of the spool sleeve is at a location nearest the solenoid and the first passage extends along a length of the spool body from a top surface of the spool body, a length of the first passage is greater than a length of the tank section of the spool sleeve.

Another aspect of the disclosure provides a first stage of a two-stage valve. The first stage of the two stage valve includes a spool body including a pilot fluid passage. The first stage of the two stage valve also includes a spool sleeve housing the spool body. The spool sleeve includes a supply section with at least one supply port in fluid communication with a hydraulic fluid supply source and a tank section with at least one tank port in fluid communication with a reservoir for the hydraulic fluid. When the first stage is deactivated, the pilot fluid passage in the spool body is blocked from receiving hydraulic fluid from the hydraulic fluid supply source. When the pilot fluid passage in the spool body aligns with the at least one supply port of the supply section, hydraulic fluid from the supply source flows through the pilot fluid passage to apply a driving force to the spool body to move the spool body along a length the spool sleeve in an actuation direction against a restoring force.

This aspect may include one or more of the following optional features. In some configurations, the spool body includes at least one working port along a central axis of the spool body. Here, the spool body may include a chamber along the central axis of the spool body and the chamber may include the at least one working port configured to selectively communicate between the at least one supply port of the supply section and the at least one tank port of the tank section.

In some examples, the spool body includes a bottom surface configured to receive the restoring force and a top surface opposite the bottom surface. In this example, when the spool body moves along the length of the spool sleeve, a control volume within the spool sleeve increases in volume above the top surface of the spool body. The driving force applied by the hydraulic fluid from the pilot fluid passage may increase in magnitude in proportion to an increase in the control volume above the top surface of the spool body.

In some implementations, the spool body includes a bottom surface configured to receive the restoring force and a top surface opposite the bottom surface. In this implementation, the spool body includes a chamber along a central axis of the spool body, the chamber includes the at least one working port configured to selectively communicate between the at least one supply port of the supply section and the at least one tank port of the tank section. An opening for the pilot fluid passage is located at a position along a length of the spool body closer to the bottom surface of the spool body than the at least one working port.

In some configurations, the spool body includes a bottom surface configured to receive the restoring force and a top surface opposite the bottom surface. In this configuration, the spool body includes a chamber along a central axis of the spool body and the chamber includes the at least one working port configured to selectively communicate between the at least one supply port of the supply section and the at least one tank port of the tank section. Further, a first distance between the at least one working port and the top surface is less than a second distance between an opening for the pilot fluid passage and the top surface.

In some examples, when the pilot fluid passage in the spool body aligns with the at least one supply port of the supply section, a first portion of the hydraulic fluid from the supply source flows through the pilot fluid passage to apply the driving force to the spool body and a second portion of the hydraulic fluid from the supply source flows through the pilot fluid passage and out of the spool sleeve to the reservoir. Here, the spool body may include a bottom surface configured to receive the restoring force and a top surface opposite the bottom surface. When the spool body moves along the length of the spool sleeve, a control volume within the spool sleeve may increase in volume above the top surface of the spool body and, in response to the increase in volume above the top surface of the spool body, the second portion of the hydraulic fluid from the supply source flowing through the pilot fluid passage and out of the spool sleeve to the reservoir may reduce in volume.

In some implementations, an activated position for the spool body corresponds to a position where at least one working port in the spool body aligns with the at least one supply port of the supply section. When the spool body moves along the length of the spool sleeve in the actuation direction to the activated position, an opening of the pilot fluid passage aligns with the at least one supply port of the supply section prior to the at least one working port aligning with the at least one supply port of the supply section.

Yet another aspect of the disclosure provides a valve. The valve includes an energizable solenoid including a solenoid chamber housing a solenoid pin. The valve also includes a proportional spool including a spool body and a spool sleeve. The spool sleeve houses the spool body and includes a supply section with at least one supply port in fluid communication with a hydraulic fluid supply source and a tank section with at least one tank port in fluid communication with a reservoir for the hydraulic fluid. The spool body includes a first fluid passage extending from a first opening to a second opening. The first opening faces the spool sleeve and the second opening faces the solenoid pin. The valve further includes a mechanical link coupling the solenoid pin to the spool body. The mechanical link at least partially includes a second fluid passage extending through the spool sleeve to the tank section. The valve also includes a flow path for hydraulic fluid from the supply source, the flow path includes the first fluid passage and the second fluid passage. When the energizable solenoid is de-energized, the first opening of the first fluid passage is not aligned with the at least one supply port of the supply section.

This aspect may include one or more of the following optional features. In some examples, the mechanical link includes a ball and an annular seat having an inner diameter to receive the ball, the second fluid passage occurs between the ball and the annular seat. Here, the valve may include a control volume between the annular seat and a top surface of the spool body facing the solenoid pin.

In some implementations, the valve includes a control volume between the mechanical linkage and a top surface of the spool body facing the solenoid pin. In this implementation, when (i) the first opening aligns with the at least one supply port of the supply section of the spool sleeve and (ii) actuation of the solenoid pin closes the second fluid passage, a volume of hydraulic fluid, supplied by the hydraulic fluid supply source through the first fluid passage, increases in the control volume. The tank section of the spool sleeve may be nearer to the mechanical linkage than the supply section of the spool sleeve.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
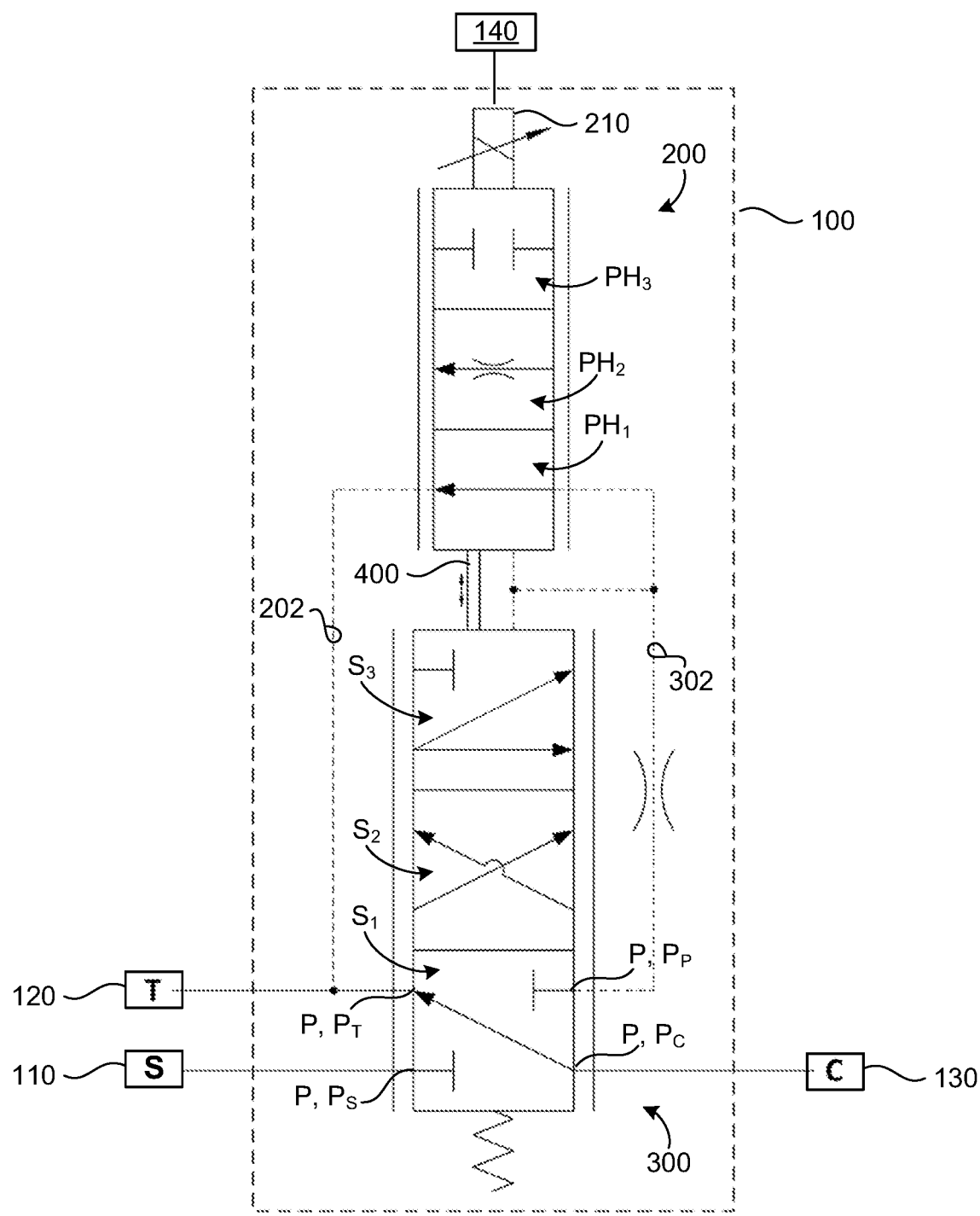
FIGS. 1A and 1B are schematic views of example two-stage valves.
Figure 1B:
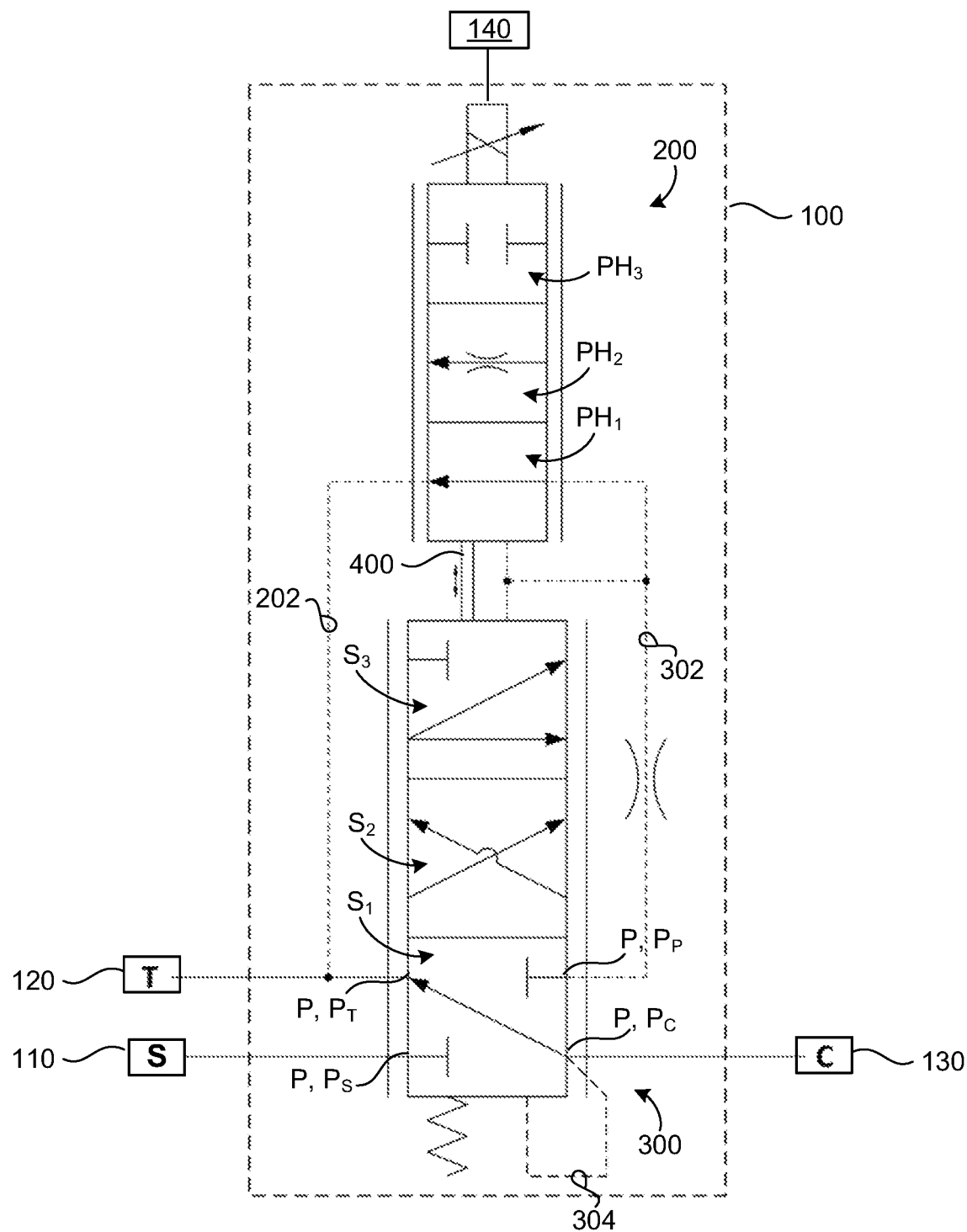

FIGS. 1A and 1B are examples of a hydraulic valve 100 (e.g. shown as a hydraulic schematic). Generally speaking, the hydraulic valve 100 is implemented in a hydraulic system 10. A hydraulic system 10 typically includes components performing operations based on fluid dynamics that may be controlled mechanically and/or electrically (e.g., by electrical signals). Here, the hydraulic system 10 includes a supply source 110, a tank 120, a control element 130, and an electrical input source 140.

Generally speaking, a supply source 110, such as a pump, is a mechanical component that generates fluid energy (i.e. fluid flow governed by fluid velocity) by transferring mechanical energy to a fluid. For example, a motor shaft transfers torque to a pump shaft and generates a fluid velocity. Hydraulic pumps may be hydrodynamic or hydrostatic. A hydrodynamic pump tends to decrease in capacity as a head pressure corresponding to the pump increases (e.g., based on fluid leakage and pressure decay when the pump stops). On the other hand, a hydrostatic pump typically delivers a fixed volume of fluid from its inlet to its outlet regardless of outlet port pressure.

Since hydraulic systems, such as the hydraulic system 10, are closed systems, hydraulic fluid of the system is often stored and/or returned to a tank 120. The tank 120 generally refers to a low pressure section of the hydraulic system 10 relative to an operating pressure of the source 110. In other words, the tank 120 may be an actual reservoir or an ancillary hydraulic circuit that operates at a lower pressure than the operating pressure. In some implementations, the hydraulic system 10 includes more than one tank 120. For instance, a hydraulic system 10 may use a first tank at one pressure and a second tank at a second pressure different from the first pressure. Here, the hydraulic system 10 may use more than one tank 120 because different components may have different pressure requirements. In other words, connecting some components to the first tank 120 may cause pressure issues in the hydraulic system 10. For example, certain hydraulic components may need a lower pressure than the first tank 120 and thus, require the second tank 120 (e.g., a pilot tank).

Typically, the hydraulic system 10 controls the fluid dynamics (e.g., pressure or flow) through the hydraulic valve 100 to operate a control element 130. For example, a control element 130 may refer to one or more hydraulic cylinders or some type of motor configured to perform work. To illustrate, when the hydraulic system 10 corresponds to an industrial or agricultural hydraulic system, the one or more control elements 130 are hydraulic cylinders that perform the work of operating hydraulic attachments (e.g., front loaders, forks, plows, rotary cutters, tillers, etc.). Here, the control element 130, as a hydraulic cylinder, may correspond to any type of cylinder utilizing hydraulic fluid, such as a single acting cylinder, a double acting cylinder, a rodless cylinder, etc.

Referring further to FIGS. 1A and 1B, the valve 100 is a single hydraulic valve 100 that includes two stages, a first stage referred to as a pilot-operated stage 200 and a second stage referred to as a main stage 300. A two-stage valve generally refers to a valve where the functionality of two valves are combined (or integrated) into a single assembly. To integrate more than one valve into a single valve often includes structural challenges (e.g., flow/porting challenges), size constraints (e.g., ensuring adequate spacing and surface areas to provide the needed hydraulic forces or distribute hydraulic forces that are present), and/or other compatibility issues. Here, the two-stage valve 100 integrates a direct drive proportional valve and a pilot-operated proportional valve. A proportional valve (also referred to as a proportional spool valve) functions to control the flow and/or the pressure to a control element 130 by applying a driving force to move a spool against a restoring force. The restoring force may be a spring force, a hydraulic force (e.g., from the control element 130), or some combination of both. In some examples, solenoids, force motors, or indirect solenoids are used to apply the force to the spool to ensure a predicable movement between positions that overcomes the restoring force. Although proportional spool valves move through infinite positions between zero to one-hundred percent stroke of the valve, proportional spool valves are often schematically represented to illustrate the key or dominate functional positions that occur as the spool moves within the sleeve. For instance, FIGS. 1A and 1B are schematic diagrams that illustrate the proportional spool valves with bars to the left and to the right of the valve to designate that the proportional spool valve moves within a sleeve. Here, the proportional spool valves for the first stage 200 and the second stage 300 have three positions (also referred to as states) in the pilot-operated stage 200 and three positions (also referred to as states) in the main stage 300.

Without their integration into the two-stage hybrid valve 100 (also referred to as simply a two-stage valve 100), both of the direct drive proportional valve and the pilot-operated proportional valve have their own individual drawbacks. For instance, a direct drive proportional valve typically uses an electromagnetic solenoid to directly drive the spool against the restoring force. As such, the architecture of the direct drive proportional valve generates a relatively low driving force which makes a direct drive proportional valve design susceptible to failures, such as contamination-induced failures. Alternatively, a pilot-operated proportional valve also employs an electromagnetic solenoid, but the solenoid actuates a poppet against a nozzle to control pilot hydraulic pressure to drive the spool against the restoring force. Although, a pilot-operated proportional valve is capable of significantly greater force potential than the direct drive proportional valve, the pilot-operated proportional valve continues to require hydraulic fluid flow in the form of pilot flow when the pilot-operated proportional valve is in a deactivated state. By continuing to use hydraulic fluid even in a de-actuated state, the pilot-operated proportional valve is inherently inefficient in its use of hydraulic fluid.

In contrast, the two-stage valve 100 is able to drive a spool using both the electromagnetic force from a solenoid (like that of a direct drive proportional valve) and additional hydraulic pressure (like that of a pilot-operated proportional valve). With this approach, the two-stage valve 100 is capable of the large force potentials akin to the pilot-operated proportional valve while avoiding continual demand for hydraulic fluid in a deactivated state. The two-stage valve 100 may be implemented for different types of control between the source 110 and the control element 130. The two-stage valve 100 may be used as a flow control valve (e.g., without pressure feedback as shown in FIG. 1A) or a pressure control valve (e.g., with pressure feedback as shown in FIG. 1B). The two-stage valve 100 may be configured as a three-way valve or a four-way valve where each "way" corresponds to the porting of the two-stage valve 100. For example, when the two-stage valve 100 is a three-way valve, the two-stage valve 100 includes three different types of ports, such as at least one supply port, at least one tank port, and at least one control port (also referred to as a working port). When the two-stage valve 100 is a four-way valve, the two-stage valve 100 includes four different types of ports, such as at least one supply port, at least one tank port, at least one first control port (e.g., for a first control element), and at least one second control port (e.g., for a second control element). Even though these variations are possible, for ease of explanation, the functionality of the two-stage valve 100 is shown and described as a three-way valve and, more particularly in FIGS. 2A-2G, as a three-way pressure control valve.

In FIGS. 1A and 1B, the two-stage valve 100 includes the pilot-operated stage 200 and the main stage 300. Here, the functionality of each stage 200, 300 operates similarly to (or may be represented as) a three-position proportional spool valve. In the pilot-operated stage 200, a solenoid 210 receives an electrical signal from the electrical input source 140. The electrical input source 140 may be any type of controller or controls configured to generate an electrical signal capable of energizing the solenoid 210. When the solenoid 210 is energized by such an electrical signal, the solenoid 210 transitions the main stage 300 from a deactivated state (e.g., shown as a first state S1 of the main stage 300) to a transition state (e.g., shown as a second state S2 of the main stage 300) by actuating a spool 310 (e.g., shown in FIGS. 2A-2G) of the main stage 300. In the first state $S_1$ or the deactivated state, hydraulic fluid is communicated between the control element 130 and the tank 120 based on a connection between a tank port P, $P_T$ and a control port P, $P_C$ within the main stage 300. Also in the first state $S_1$, a supply port P, $P_S$ is closed such that the source 110 does not supply any hydraulic fluid to the control element 130 or a pilot line 302. To symbolize that the pilot line 302 does not receive any hydraulic fluid, a pilot port P, $P_P$ of the main stage 300 is illustrated as a closed port in the first state $S_1$.

As command to the solenoid 210 continues to increase (e.g., receives a larger amount of current than the initial energizing current supplied by the electrical signal), the solenoid 210 actuates the spool 310 of the main stage 300 to the second state $S_2$ where hydraulic fluid begins to flow from the source 110 to the pilot line 302 based on a fluid connection between the supply port $P_S$ and the pilot port $P_P$. With the fluid connection between the supply port $P_S$ and the pilot port $P_P$, pilot hydraulic pressure may begin to build to a pressure level capable of actuating the spool of the main stage 300. Here, the pilot control pressure generates a hydraulic force F against the spool 310 such that actuation of the spool 310 transitions from solenoid control to pilot control. In other words, the hydraulic force F from the pilot control pressure takes over driving the spool 310 from the solenoid 210 and continues to drive the spool 310 to an activated state (e.g., shown as a third state $S_3$). While the spool 310 is in the second state $S_2$, the hydraulic fluid communication between the control element 130 and the tank 120 still exists due to the fluid connection between the control port $P_C$ and the tank port $P_T$, but this fluid connection begins to close as the spool 310 enters the third state $S_3$ (i.e., the activated state). In the activated state or the third state $S_3$, the tank port $P_T$ is closed and the source 110 provides hydraulic fluid to both the pilot line 302 (via the pilot port $P_P$) and the control element 130 (via the control port $P_C$). With hydraulic fluid from the source 110, the control element 130 may perform some degree of work (e.g., at hydraulic cylinders or a motor). Additionally or alternatively, FIG. 1B illustrates that, when the two-stage valve 100 includes pressure feedback, the control element 130 and/or the control port $P_C$ may include a pressure feedback line 304 that provides hydraulic fluid to aid the restoring force against the spool 310.

In some implementations, such as FIGS. 1A and 1B, the pilot line 302 acts as an orifice for the hydraulic fluid. For instance, the pilot line 302 has an opening or area smaller than the pilot port $P_P$ and/or the supply port $P_S$. Based on the design of this smaller volume for the pilot line 302, the hydraulic fluid flowing through the pilot line 302 may have an increased flow rate and/or pressure. In other words, the two-stage valve 100 may be designed to control the hydraulic fluid pressure for the pilot line 302 that continues to drive the spool 310 to the activated state $S_3$. In FIGS. 1A and 1B, the concave lines around the pilot line 302 schematically designate a nozzle.

As the spool 310 of the main stage 300 transitions between states S, the pilot-operated stage 200 may also function like that of a proportional valve transitioning between states S. For instance, the pilot-operated stage 200 is represented as a two-way, three position (i.e., state) proportional valve. As a three-position proportional valve, FIGS. 1A and 1B depict the pilot-operated stage 200 with three phases PH, $PH_{1-3}$. The pilot-operated stage functions as a proportional valve by the manner in which the solenoid pin 212 of the solenoid 210 is commanded to move through a magnetic field using an electrical signal from the electrical input source 140. For example, as shown in FIGS. 2A-2G, the solenoid pin 212 moves along a valve tube 218 in the pilot-operated stage 200 and transitions the pilot-operated stage 200 between PH, $PH_{1-3}$. While the pilot-operated stage 200 transitions between phases PH, the pilot-operated stage 200 is considered a two-way proportional valve because, in some configurations, the pilot-operated stage 200 includes a first and a second way that correspond to a pathway for the pilot hydraulic fluid to flow through the pilot-operated stage 200 of the two-stage valve 100. For instance, FIGS. 1A and 1B illustrate the pathway as a fluid connection from the pilot line 302 to the outlet line 202 and then to the tank 120. As shown in FIGS. 2A-2G, the pilot hydraulic fluid from the pilot line 302 flows into a portion of the pilot-operated valve 200 and out of a passage (e.g., shown as the passageway 424) to tank 120. In the first phase $PH_1$ and the second phase $PH_2$ of the pilot-operated valve 200, pilot hydraulic fluid flows from the inlet of the passage to the outlet of the passage to tank 120. In some examples, the difference between the first phase $PH_1$ and the second phase $PH_2$ is that actuation of the solenoid 210 restricts or reduces a size of the inlet of the passage; therefore, creating a nozzle effect for the pilot hydraulic fluid as it flows from the inlet of the passage to the outlet of the passage in the second phase $PH_2$ (e.g., when compared to the first phase $PH_1$ without restriction of the inlet of the passage).

In some configurations, the pilot-operated stage 200 and the main stage 300 operate together using a mechanical link 400. Here, the mechanical link 400 functions to couple actuation of the solenoid 210 (e.g., the solenoid pin 212) with the spool 310 of the main stage 300. With coupled actuation between the pilot-operated stage 200 and the main stage 300, phases PH of the pilot-operated stage 200 may be linked or correspond to states S of the main stage 300. As the main stage 300 moves from a deactivated state (the first state $S_1$) to the actuated state (the third state $S_3$), the pilot-operated stage 200 moves through three phases PH, $PH_{1-3}$. In other words, when the actuation of the spool 310 transitions from solenoid control to pilot control, the pilot-operated stage 300 may change between the three phases PH corresponding to an open flow phase or first phase PH, $PH_1$, a restricted flow phase or second phase PH, $PH_2$, and a closed flow phase PH, $PH_3$. For instance, when the main stage 300 is in the second state $S_2$ and the source 110 is supplying hydraulic fluid to the pilot line 302, the pilot-operated stage 200 may be in its first phase $PH_1$. When actuation of the spool 310 transitions from solenoid control to pilot hydraulic fluid control, the pilot-operated stage 200 may have shifted to the second phase $PH_2$ where the flow of pilot hydraulic fluid becomes more restricted. As the main stage 300 transitions between the second state $S_2$ and the third state $S_3$, actuation of the spool 310 demands an increased amount of hydraulic force against the restoring force by the pilot hydraulic fluid. To satisfy this demand for an increase in hydraulic force, the pilot-operated stage 200 may shift to the third phase $PH_3$ preventing pilot hydraulic fluid from exiting through the passage to the outlet line 202. By preventing pilot hydraulic fluid from exiting the two-stage valve 100 through the outlet line 202, the pilot-operated stage 200 ensures that the pilot hydraulic fluid remains within the two-stage valve 100 to provide enough force to drive the spool 310 to the actuated state (i.e., the third state $S_3$) of the main stage 300.

FIGS. 2A-2G are examples of a two-stage valve 100. In these examples, the pilot-operated stage 200 includes the solenoid 210 and a housing assembly 220. In some implementations, the housing assembly 220 includes a main housing 222, a solenoid connector housing sub-assembly 224 and a coil housing 226. The solenoid connector sub-assembly 224 may further includes a housing cap 224, 224a, a solenoid connector receptacle 224, 224b, a connector housing gasket 224, 224c, and a magnetic pole 224d. The solenoid connector sub-assembly 224 is generally configured to enable a mating connector to plug into the connector receptacle 224b to make contact with the terminals protruding from the coil housing 226. The mating connector may be wired to the electrical input source 140 and able to communicate the electrical signal from the electrical input source 140 to energize the solenoid 210. Here, one or more components of the solenoid connector sub-assembly 224 (e.g., the housing cap 224a or the housing gasket 224c) may allow the connector connection and/or the solenoid itself to be sealed/protected from elements of the environment, such as contaminants or moisture.

Figure 2A:
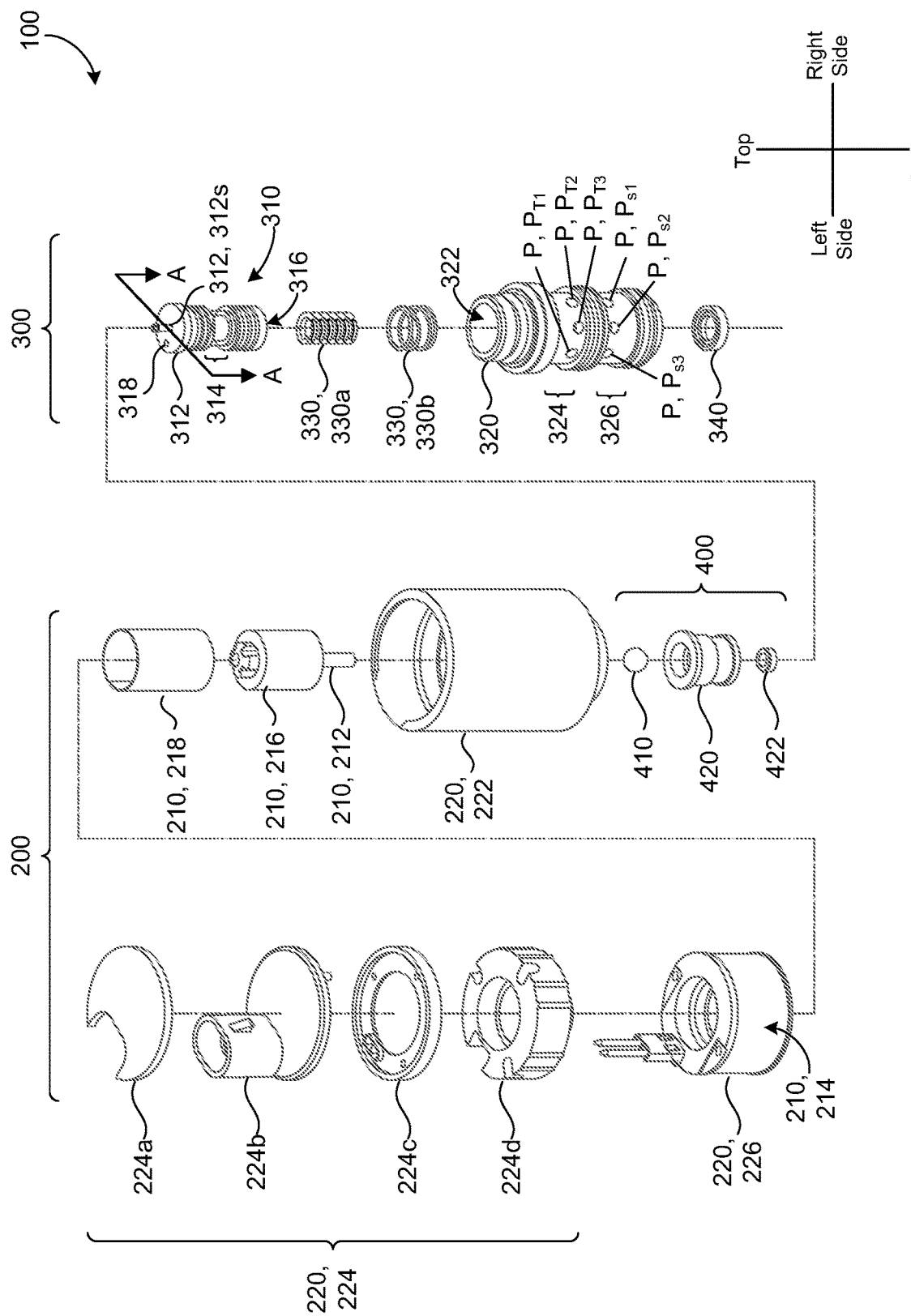
FIG. 2A is an exploded view of an example two-stage valve.

As illustrated in FIG. 2A, the housing cap 224a refers to an outermost top surface of the solenoid connector housing sub-assembly 224 that, at least partially wraps around the portion of the connector receptacle 224b protruding from a top surface of the connector receptacle 224b. Here, the protrusion of the receptacle 224b is configured to receive a mating connector and to at least partially enclose and/or seal any terminals or internal connections from potential damage. The connector housing gasket 224c is another protective layer for the housing 220 that is configured to generate a protective barrier for the internal components of the solenoid 210. Beneath the connector housing gasket 224c, a sequence of metal windings called coils 214 are wrapped circumferentially around the coil housing 226 in order to generate a magnetic field along a central axis of the housing assembly 222. When the electrical input source 140 provides an electrical signal in the form of current to energize the solenoid 210, the coils 214 generate a magnetic field.

A solenoid 210 typically refers to a combination of an armature 216, the solenoid pin 212 (also referred to as a plunger), and the coils 214. When an electric current is applied to the solenoid 210 (e.g., by the electrical input source 140), the coils 214 generate the magnetic field with a magnetic force capable of actuating the armature 216 into the solenoid pin 212; displacing the solenoid pin 212 some distance within a solenoid chamber 218 (e.g., shown as a cylindrical valve tube that circumferentially encases the armature 216 and solenoid pin 212 within the main housing 222). With the structure of the two-stage valve 100, the displacement of the solenoid pin 212 may drive the solenoid pin 212 towards or into the spool 310. Here, a direction of actuation for the solenoid pin 212 refers to a direction that would push the spool 310 against the spool's restoring force. In some configurations, the two-stage valve 100 is a cylindrical valve 100 where the pilot-operated stage 200 is disposed on top of the main stage 300 such that the solenoid pin 212 is driven downwards (e.g., along a central axis of the valve 100) towards the spool 310.

As for the general structure of the pilot-operated stage 200, the main housing 222 may be constructed to receive the components of the solenoid 210 and at least a portion of the coil housing 226 in order to form the outer shell (i.e., outer walls) for the pilot-operated stage 200 of the two-stage valve 100. The connector housing sub-assembly 224 may be disposed on the coil housing 226 and/or the main housing 222 to enclose the solenoid 210 within the main housing 222. When the two-stage valve 100 is generally cylindrical, the components of the pilot-operated stage 200 may be aligned along a central axis of the cylindrical shape. In other words, the main housing 222 along with the coil housing 226 have a hollow central chamber configured to enable the armature 216 and/or the solenoid pin 212 to be surrounded (e.g., circumferentially surrounded) by the magnetic field generated from the coils 214 and to move along the central axis based on the magnitude of the magnetic force generated by the magnetic field.

The main stage 300 generally includes the spool 310 and a spool sleeve 320. The spool 310 is configured to move along the inner walls of the spool sleeve 320 such that the spool 310 translates along a length of the spool sleeve 320 to move between the states S of the main stage 300. In some examples, the spool 310 includes a spool body 312 that is generally cylindrical in shape. The spool body 312 may include a control port section 314 with an annular land that enables hydraulic fluid to be returned from (e.g., returned to tank 120) or supplied to (e.g., supplied by the source 110) the control element 130. For instance, the annular land refers to a circumferential cutaway along the body 312 of the spool 310 where the cutaway portion of the body 312 (i.e., control port section 314) has an outer diameter that is less than an average outer diameter for the entire body 312 of the spool 310. In some configurations, the annular land leads to at least one control port $P_C$ formed within a control port chamber 316 of the body 312 of the spool 310. For instance, the spool body 312 includes a control port chamber 316 as a cavity within the spool body 312 along a central axis of the spool 310. To illustrate, FIGS. 2B-2G depict the control port chamber 316 as a hollow cavity within the spool body 312 that extends from a bottom surface of the spool 310 that is opposite a top surface of the spool 310 facing the solenoid pin 212 along the central axis of the body 312.

In some configurations, the chamber 316 includes more than one control port $P_C$ corresponding to openings extending from the outer diameter for the body 312 at the control port section 314 to the inner diameter of the body 312 forming the walls of the chamber 316. For instance, the control ports $P_C$ are spaced (e.g., evenly spaced) around a circumference of the body 312 of the spool 310 in the control port section 314 of the body 312. In some examples, the control port section 314 occurs near or at a midpoint along a length of the spool body 312.

In some configurations, the spool sleeve 320 is a cylindrical tube that encases the body 312 of the spool 310. Here, an inner diameter for the walls of the spool sleeve 320 is substantially equal to the outer diameter of the spool body 312 in order to prevent hydraulic fluid from significantly leaking between the spool sleeve 320 and the body 312 of the spool 310. For example, the walls of the spool sleeve 320 may define a hollow central cavity 322 that the body 312 of the spool 310 at least partially occupies as it moves along the inner walls of the spool sleeve 320. As the body 312 of the spool 310 moves along the spool sleeve 320, the control port section 314 of the body 312 may align with a tank section 324 of the spool sleeve 320, a supply section 326 of the spool sleeve 320, or neither section 324, 326. In some examples, due to the area of the control port section 314 and the spacing between the tank section 324 and the supply section 326, the control port section 314 is unable to align with both sections 324, 326 at once. In other words, the two-stage valve 100 may not have a configuration that simply loops hydraulic fluid from the source 110 to the tank 120 via the two-stage valve 100. Each of the tank section 324 and the supply section 326 of the spool sleeve 320 refers to an area along the length of the spool sleeve 320 that either receives hydraulic fluid from the source 110 (i.e., the supply section 326) or returns hydraulic fluid to the tank 120 (i.e., the tank section 324).

In some examples, the tank section 324 and the supply section 326 are fluidly insulated from each other by a seal 328, such as an o-ring that sits within an annular groove around the circumference of the spool sleeve 320. For instance, FIGS. 2B-2G depict three annular seals 328, 328a-c. The first annular seal 328a is located near the pilot-operated stage 200 of the two-stage valve 100 and constrains the return hydraulic fluid to the tank 120 from leaking (i.e., escaping) out of the tank section 324 (e.g., to an environment around the two-stage valve 100). The second annular seal 328b is located between the tank section 324 and the supply section 326 and prevents supplied hydraulic fluid from leaking into the tank section 324 (e.g., and reducing the pressure of the hydraulic fluid being supplied) and/or hydraulic fluid that is returning to the tank 120 from leaking into the supply section 326 (e.g., and also reducing the pressure of the hydraulic fluid being supplied). The third annular seal 328c is located at an end of the two-stage valve 100 opposite the pilot-operated stage 200. Here, this third annular seal 328c constrains the supplied hydraulic fluid from the source 110 from leaking (i.e., escaping) out of the supply section 326 (e.g., to an environment around the two-stage valve 100).

Each of the tank section 324 and the supply section 326 may include one or more ports P that allow the hydraulic fluid to be communicated between the source 110, the tank 120, the control element 130, and/or the pilot line 302. In some examples, such as FIGS. 2A-2G, each section 324, 326 includes a plurality of ports P. For example, FIG. 2A illustrates ports P evenly spaced around a circumference of the spool sleeve 320 in each respective section 324, 326. In some implementations, ports P of the same type are coplanar and distributed along the circumference of the spool sleeve 320. In FIG. 2A, three tank ports $P_{T1\text{-}3}$ are visible, while three supply ports Psi-3 are visible. By having ports P spaced along the circumference of the spool sleeve 320, the two-stage valve 100 may maintain stability and balance when encountering the forces associated with hydraulic fluid as they impact the cylindrical shape. For instance, the cross-sectional views of FIGS. 2B-2G illustrate that the ports P may be symmetrically spaced about the circumference of the spool sleeve 320.

In some configurations, the vertical spacing (e.g., along the length of the spool sleeve 320) between a tank port $P_T$ and a supply port $P_S$ is a distance that is greater than or equal to a length of the control port section 314 of the body 312 of the spool 310. By having the distance between ports P that is greater that the length of the control port section 314, the geometry of the spool sleeve 320 relative to the body 312 enables the electronic signal and/or the hydraulic force F to select if the control element 130 is fluidly connected to one of the source 110 or the tank 120.

Figure 2B:
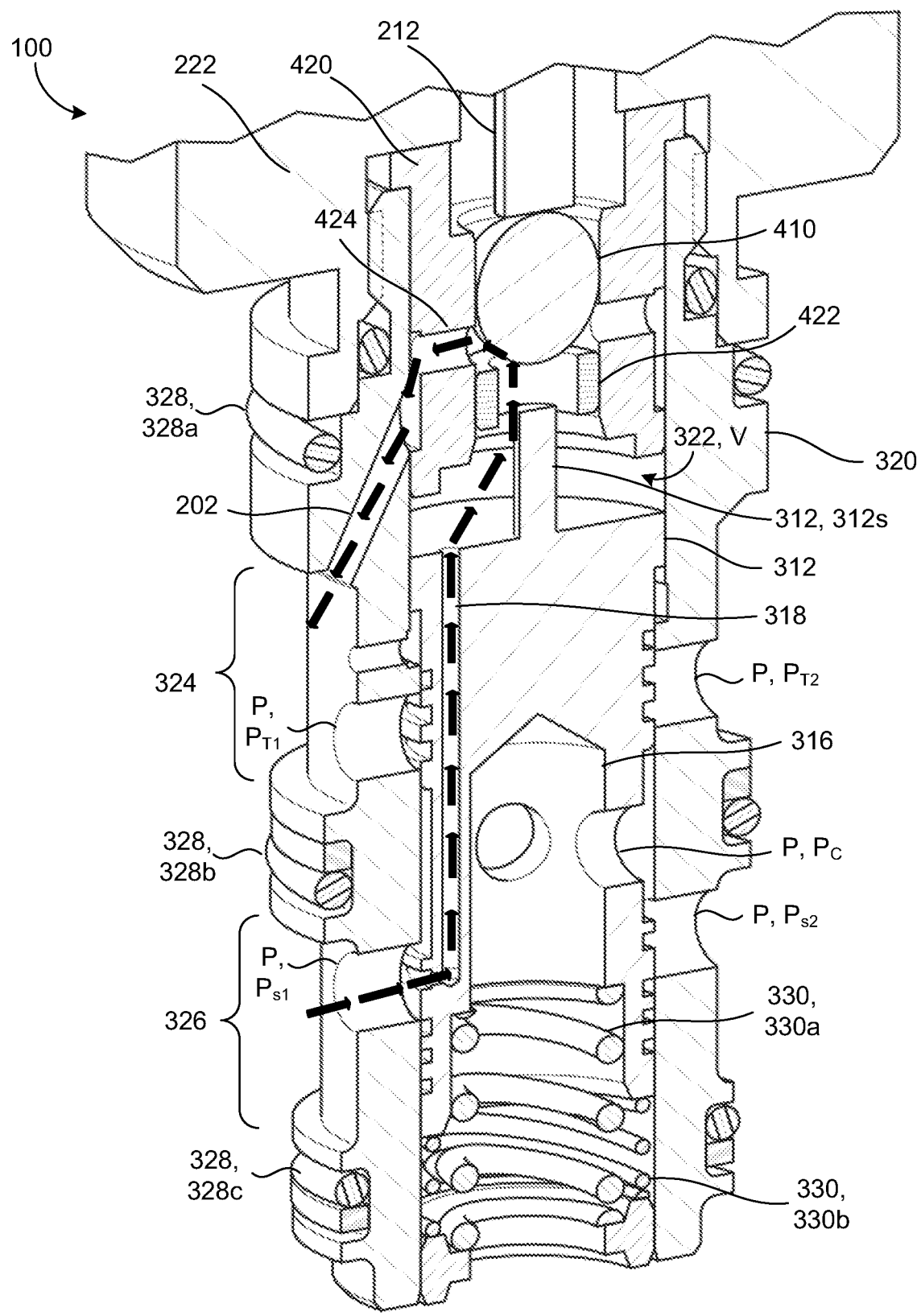
FIGS. 2B and 2C are perspective sectional views of an example two-stage valve of FIG. 2A along the cut line A-A.
Figure 2C:
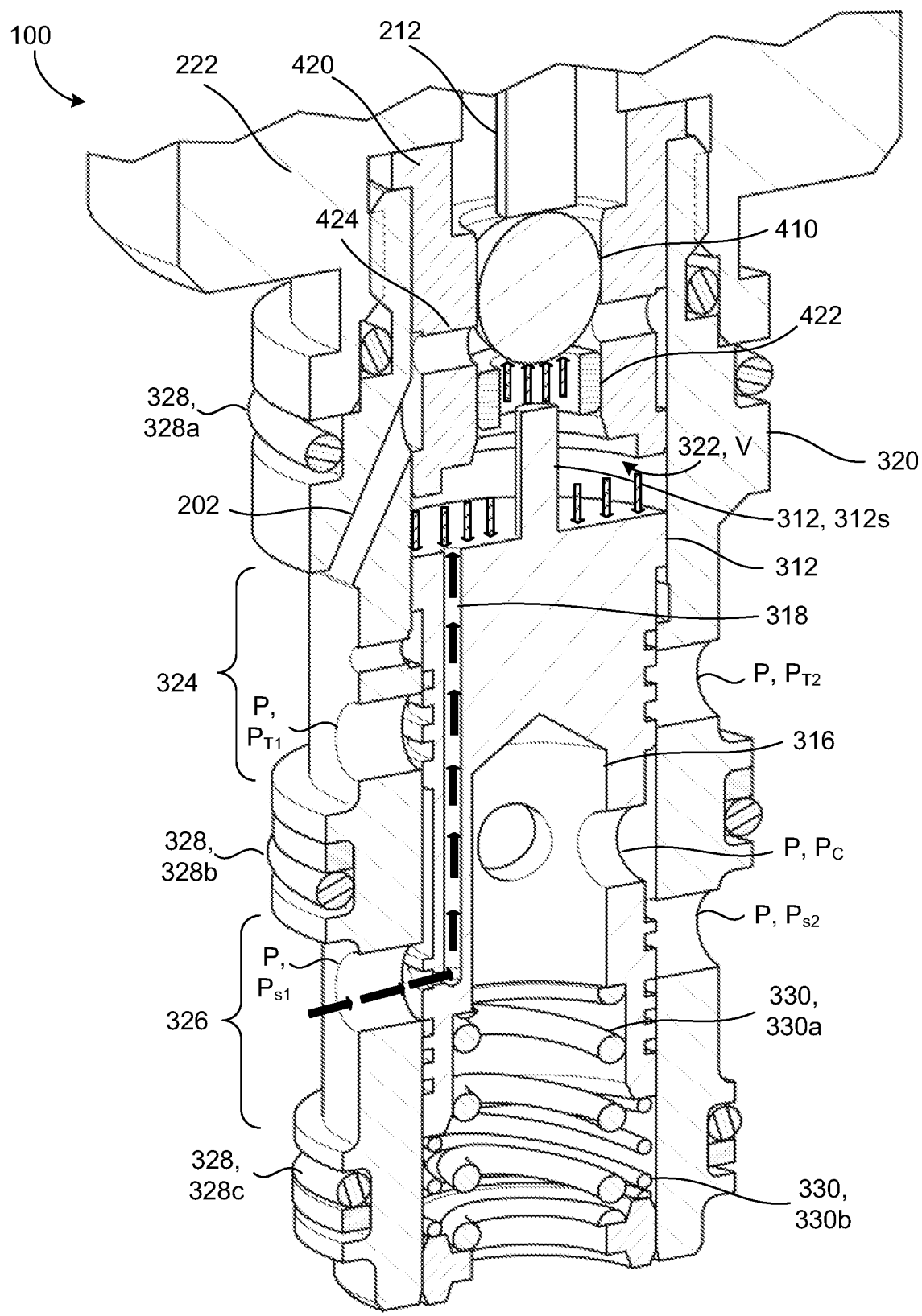

The spool body 312 also includes a pilot passage 318 as the pilot line 302 or a portion of the pilot line 302. For example, FIGS. 2B and 2C depict the pilot passage 318 as a channel bored out of the body 312 of the spool 310 to enable pilot hydraulic fluid to move from the supply section 326 to a volume V (e.g., the control volume V shown in FIGS. 2B, 2C, and 2D-2G) above the body 312 of the spool 310 within the cavity 322 of the spool sleeve 320. For instance, the pilot passage 318 is located between the outer diameter of the body 312 and the inner diameter forming the cavity 322. Based on the design of the two-way valve 100, an opening 318o of the pilot passage 318 that receives the hydraulic fluid from the source 110 is able to fluidly communicate with the supply section 326 of the spool sleeve 320, but unable to communicate with the tank section 324 of the spool sleeve 320. In other words, in some examples, a length of the pilot passage 318 within the body 312 (e.g., the length extending from the top surface of the body 312 to near the supply section 326) is greater than a distance between a top surface of the body 312 and a tank port $P_T$. Stated differently, the pilot passage 318 is unable to fluidly communicate with the tank 120. In contrast, pilot hydraulic fluid passed through the pilot passage 318 may flow through at least a portion of the pilot-operated stage 200 and out to tank 120 via the outlet line 202.

In some examples, the spool body 312 includes a stem 312s. Here, the stem 312s refers to a cylindrical rod that extends from a top surface of the spool body 312 (e.g., the surface facing the solenoid pin 212) towards the solenoid pin 212. In some implementations, the solenoid pin 212 couples with the spool 310 by coupling with the stem 312s of the body 312 of the spool 310. When the spool 310 couples with the solenoid pin 212 via the mechanical link 400, the stem 312s may be the element of the spool 310 that couples with the mechanical link 400. In other words, the stem 312s may receive the actuation force that moves the spool 310 along the spool sleeve 320.

In some configurations, the restoring force applied to the spool 310 occurs using one or more springs 330. For instance, in FIGS. 2A-2G, a first spring 330, 330a and a second spring 330, 330b jointly apply the restoring force to the spool 310. Here, each spring 330 applying the restoring force is positioned between the bottom surface of the spool 310 and the end (e.g., the end cap 340) of the two-stage valve 100 in the chamber cavity 322 of the spool sleeve 320. Additionally or alternatively, one or more of the springs 330 are located within the chamber 316 of the body 312. Regardless of the particular location, the restoring force refers to a force applied to the spool 310 against its direction of actuation. In some examples, the restoring force also positions the spool 310 to a default position. For instance, the restoring force positions the spool 310 to the default position when the two-stage valve 100 is in a deactivated state (e.g., the first state $S_1$) where the spool 310 is not providing any force to counteract the restoring force. In some implementations, such as FIG. 1B, a control line 304 from a control element 130 or a control port $P_C$ provides hydraulic fluid against the spool 310 instead of a spring restoring force or in addition to the spring restoring force (e.g., as shown in FIG. 1B).

In some configurations, a mechanical link 400 exists between the pilot-operated stage 200 and the main stage 300 such that the mechanical link 400 is positioned as an intermediary to couple the solenoid pin 212 with the spool 310. In some examples, such as FIGS. 2A-2G, the mechanical link 400 includes a ball 410 and a ball chamber 420 housing the ball 410. Additionally, the ball chamber 420 may be defined as some form of a restrictive element that, for example, includes an annular seat 422 or some other restrictive feature able to decouple the solenoid pin 212 and the spool 310 during operation of the valve 100. Here, the ball chamber 420 may be located or inserted between the main housing 222 of the pilot-operated stage 200 and the spool sleeve 320 of the main stage 300. The ball chamber 420 may have a hollow cavity along its central axis. In some examples, the width of the hollow cavity is about equal to the diameter of the ball 410 and/or an outer diameter of the annular seat 422. When the ball chamber 420 is configured to include the seat 422, the relationship between the inner diameter of the seat 422 is smaller than an outer diameter of the ball 410. With the ball 410 as at least part of the mechanical link 400, the solenoid pin 212 is configured to drive the ball 410 into a restrictive element and/or restrictive space and initially provide the driving force for the spool 310 (e.g., at the stem 312s of the spool 310). For instance, the solenoid pin 212 is configured to drive the ball 410 into a portion of the ball chamber 420 (e.g., the seat 422 or a restrictive portion of the chamber 420). Yet once the solenoid pin 212 completely drives the ball 410 into the restrictive element (e.g., the seat 422), pilot hydraulic fluid, received from the passage 318, may not flow past the ball 410; resulting in an increased build-up of hydraulic fluid from the pilot passage 318 (e.g., in a control volume V between the ball 410 and the top surface of the spool 310). By increasing the amount of hydraulic fluid above the spool body 312 (e.g., in the control volume V), the force/pressure on the top surface of the spool 310 from this hydraulic fluid is capable of continuing to drive the spool 310 in a direction towards the restoring force to the actuated state $S_3$. Here, the restrictive element acts as a mechanical stop for the solenoid pin 212. For instance, the annular seat 422 acts as the mechanical stop for the solenoid pin 212 such that the ball 410 seated in the annular seat 422 prevents the solenoid pin 212 from further actuating the spool 310. In other words, even if a current induces the solenoid pin 212 to apply more force on the ball 410, the annular seat 422 prevents the ball 410 from any further travel and the solenoid pin 212 is not able to actuate the spool 310 any further. Although the figures depict the restrictive element as an annular seat 422 within the ball chamber 420, the restrictive element may refer to any element that prevents the solenoid pin 212 from further actuating the spool 310 by limiting the solenoid pin travel.

In some examples, the ball chamber 420 includes at least one fluid passageway 424. In these examples, the fluid passageway 424 fluidly connects the outlet line 202 with the pilot passage 318 (i.e., the pilot line 302). In some implementations the fluid passageway 424 connects the outlet line 202 to the pilot passage 318 at the base of the main housing 222 where the solenoid pin 212 would contact the spool 310.

FIGS. 2B and 2C illustrate the flow path for the pilot hydraulic fluid (e.g., the flow path is shown in arrows). When the solenoid 210 is energized such that the spool body 312 moves to a position where a first opening 318o, 318oi of the pilot passage 318 aligns with a supply port $P_S$ of the spool sleeve 320, FIG. 2B depicts that the pilot hydraulic fluid travels through the passage 318 that is smaller than the supply port $P_S$ and out of a second opening 318o, 31802 of the pilot passage 318 into the cavity 322 above the top surface of the spool 310. Here, the stem 312s of the spool 310 has a smaller diameter than an inner diameter of the annular seat 422. With the stem 312s having a smaller diameter, the pilot hydraulic fluid is able to pass between the stem 312s and the hollow inside of the annular seat 422 such that the flow path also includes the volume between the stem 312s and the annular seat 422. In FIG. 2B, the ball 410 is not completely forced against the annular seat 422, therefore, the pilot hydraulic fluid may continue to flow between the ball 410 and the annular seat 422, out the fluid passageway 424 of the ball chamber 420, and continue out the outlet line 202 connected to the tank 120. Therefore, the flow path for the pilot hydraulic fluid may include the pilot passage 318, the volume between the mechanical linkage 400 (e.g., a first volume between the stem 312s and the annular seat 422 in combination with a second volume between the ball 410 and the annular seat 422), the fluid passageway 424, and the outlet line 202 that connects to the fluid passageway 424. Referring to FIG. 2B, the fluid passageway 424 extends through the wall of the ball chamber 420 and the outlet line 202 extends through the wall of the spool sleeve 320 (e.g., to the tank section 324 of the spool sleeve 320).

FIG. 2C, in contrast to FIG. 2B, does not entirely focus on the flow path for the pilot hydraulic fluid, but rather the pressure that the pilot hydraulic fluid generates. For instance, as the solenoid 210 is energized, the pilot hydraulic fluid will continue to build pressure against the ball 410 as well as against the top surface of the spool body 312. Moreover, this figure indicates that a completely seated ball 410 (i.e., a ball 410 forced into the inner diameter of the annular ring 422) prevents the pilot hydraulic fluid from entering the passageway 424 and causes greater pressure/force on the spool itself in the direction of the restoring force. In this scenario, the greater pressure/force are used to then actuate the spool 310 further along the spool sleeve 320 to the actuated site $S_3$.

Figure 2D:
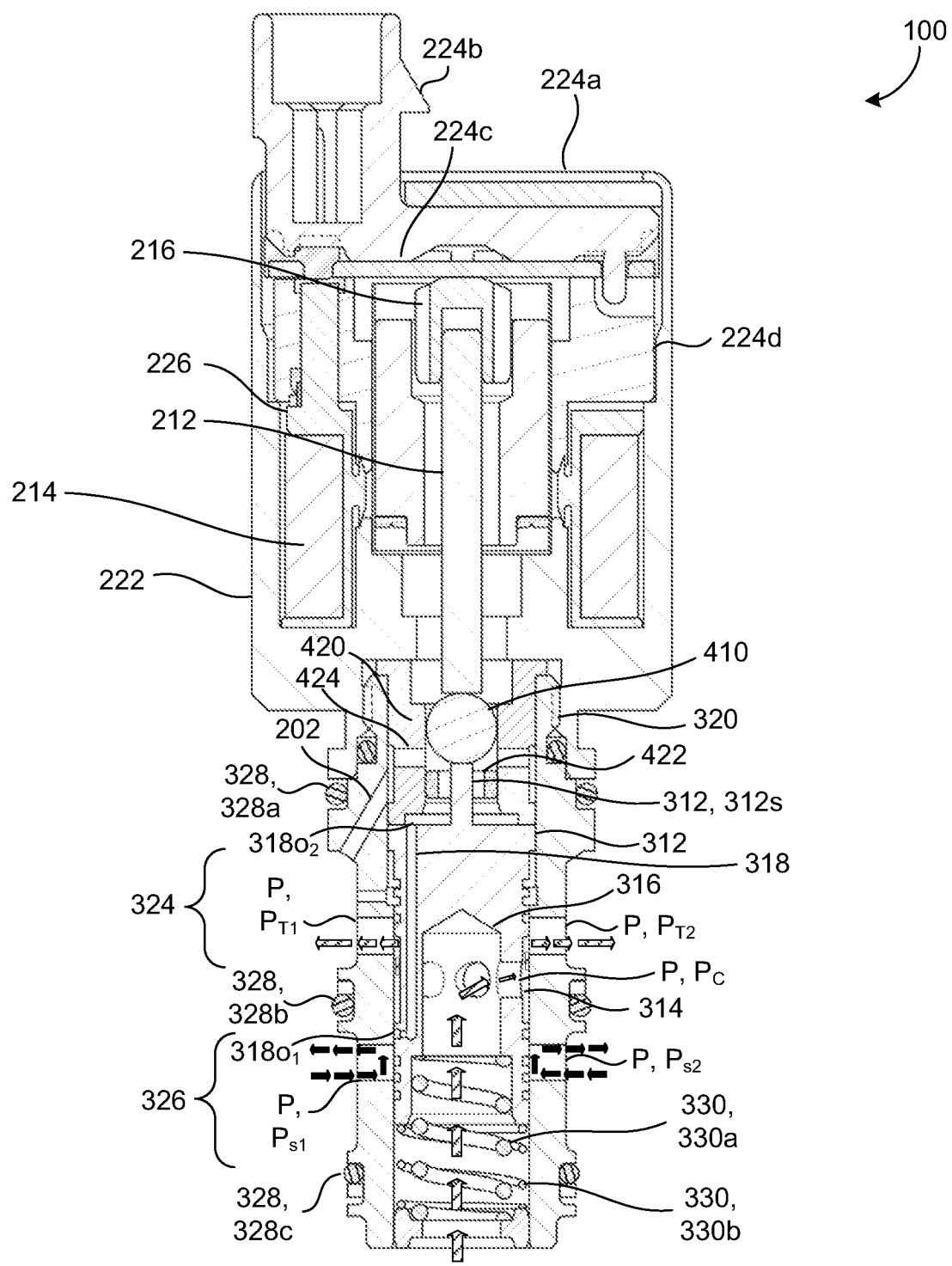
FIG. 2D is a cross sectional view of the example two-stage valve of FIG. 2A in a deactivated state.

FIGS. 2D-2G are examples of the two-stage valve 100 transitioning between states S and/or phases PH and the hydraulic flow that accompanies these states/phases. To illustrate the hydraulic flow, hydraulic fluid from the source 110 is shown in black filled arrows, while hydraulic fluid returning to tank 120 is shown in hatched arrows. In FIG. 2D, the two-stage valve 100 is in a deactivated state (e.g., the first state $S_1$ of FIGS. 1A and 1B). In a deactivated state, the solenoid 210 has not received an electrical signal that energizes the solenoid 210. In this deactivated state, the solenoid pin 212 is retracted away from the spool 310 due to a lack of an actuation force on the solenoid pin 212 generated by a magnetic field from the coils 214. Yet in some examples, the solenoid pin 212 is in contact with (or coupled to) the ball 410, which, in turn, is in contact with (or coupled to) the spool 310 (e.g., the stem 312s of the spool body 312). Here, without the solenoid 210 being energized, there does not exist the energy to generate the magnetic field. Starting from this deactivated state where both the solenoid pin 212 is coupled to the ball 410 and the stem 312s of the spool 310 is also coupled to the ball 410, any force thereafter mechanically imparted on the ball 410 by the solenoid pin 212 may be equal to the force generated by the solenoid 210. With respect to the main stage 300, in the deactivated state, the spool 310 is fully retracted toward the solenoid pin 212 to a position based on the restoring force of the spring(s) 330. Here, the retracted position is shown as the top surface of the body 312 of the spool 310 in contact with a base of the ball chamber 420. As was described with respect to the first state $S_1$ for the main stage 300 in FIGS. 1A and 1B, during the deactivated state, supply port(s) $P_S$ are blocked/closed and there is a fluid connection between the control element 130 and the tank 120. Accordingly, the pilot passage 318 is physically blocked as well preventing any undesired pilot hydraulic fluid from flowing into some portion of the two-stage valve 100 in this state $S_1$. For FIG. 2D, this means that the control port section 314 of the body 312 of the spool 310 is not aligned with the supply section 326, but instead partially aligned (i.e., partially open) with the tank section 324. Due to this partial alignment, hydraulic fluid from the control element 130 may return to the tank 120 using a fluid connection between the control port $P_C$ and the tank port $P_T$.

Figure 2E:
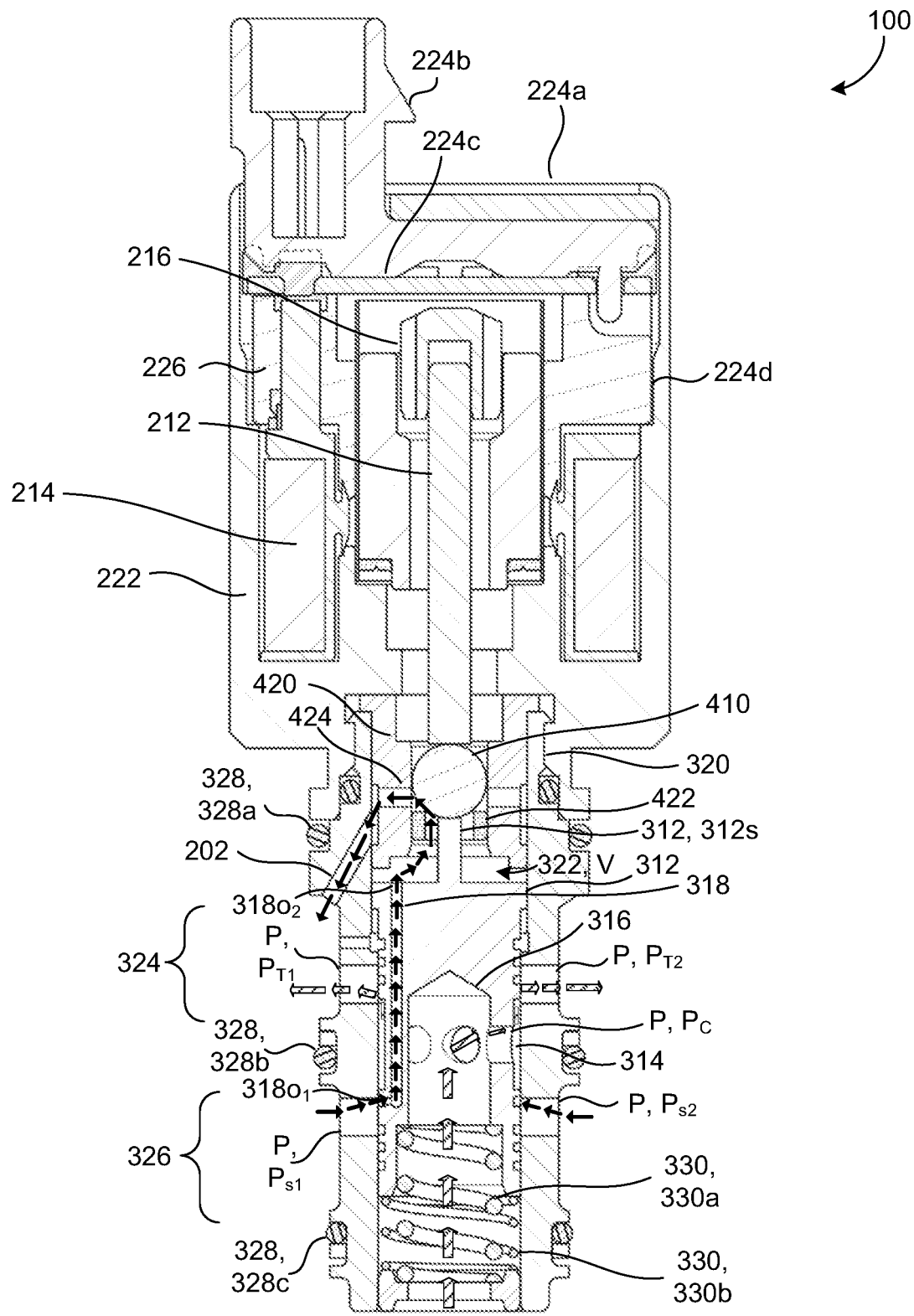
FIG. 2E is a cross sectional view of the example two stage valve of FIG. 2A in a transitional state.

In FIG. 2E, the pilot-operated stage 200 receives a command (e.g., an electrical signal) that energizes the solenoid 210 and transitions the spool 310 to the flow phase $PH_1$ of the transition state $S_2$ (e.g., shown in FIGS. 1A and 1B as the first phase $PH_1$ for the second state $S_2$). Based on this command, the solenoid pin 212 is partially extended while in contact with the ball 410. By partially extending the solenoid pin 212, (which is also in contact with the ball 410) the solenoid pin 212 moves the stem 312s of the spool 310 (and the spool 310) in proportion to the solenoid pin's extension. With this initial coupling between the solenoid 210, the ball 410, and the spool 310 (e.g., the stem 312s of the spool 310), the two-stage valve 100 operates similar to a direct drive proportional valve because force mechanically imparted by the solenoid pin 212 is directly transferred to the spool 310 by the ball 410. Here, the coupling therefore moves the spool 310 a distance along the spool sleeve 320 that is about equal to a distance traveled by the solenoid pin 212. In this flow phase $PH_1$ of the transition state $S_2$, the opening 318o for the passage 318 within the body 312 of the spool 310 becomes aligned with the supply section 326 of the spool sleeve 320. With this alignment, the pilot passage 318 receives hydraulic fluid from the source 110 and the passage 318 transfers the pilot hydraulic fluid to the chamber cavity 322 of the spool sleeve 320 above the top surface of the body 312. Here, since the ball 410 has not been completely seated in the seat 422, the pilot hydraulic fluid from the passage 318 flows between the stem 312s and the annular seat 422, then between the ball 410 and the seat 422, and out to tank 120 through a combination of the passageway 424 in the ball chamber 420 and the outlet line 202. In this phase $PH_1$ of the transition state $S_2$, the hydraulic force imparted on the top surface of the spool 310 is negligible or minimal because the gap between the ball 410 and the seat 422 is large enough to prevent the buildup of any significant pilot hydraulic pressure in the chamber cavity 322. With motion of the spool 310 towards the transition state $S_2$ (i.e., the state where the valve is transitioning from solenoid control to pilot control), the total force imparted to the spool 310 is nearly equal to the force imparted to the spool 310 by the solenoid 210. Additionally, in this phase $PH_1$ of the transition state $S_2$, the position of body 312 of the spool 310 still aligns some of the control port section 314 of the body 312 of the spool 310 with the tank section 324 of the spool sleeve 320 and not with the supply section 326 of the spool sleeve 320. With this alignment to the tank section 324, some of the hydraulic fluid from the control element 130 may return to the tank 120 using a fluid connection between the control port $P_C$ and the tank port $P_T$.

Figure 2F:
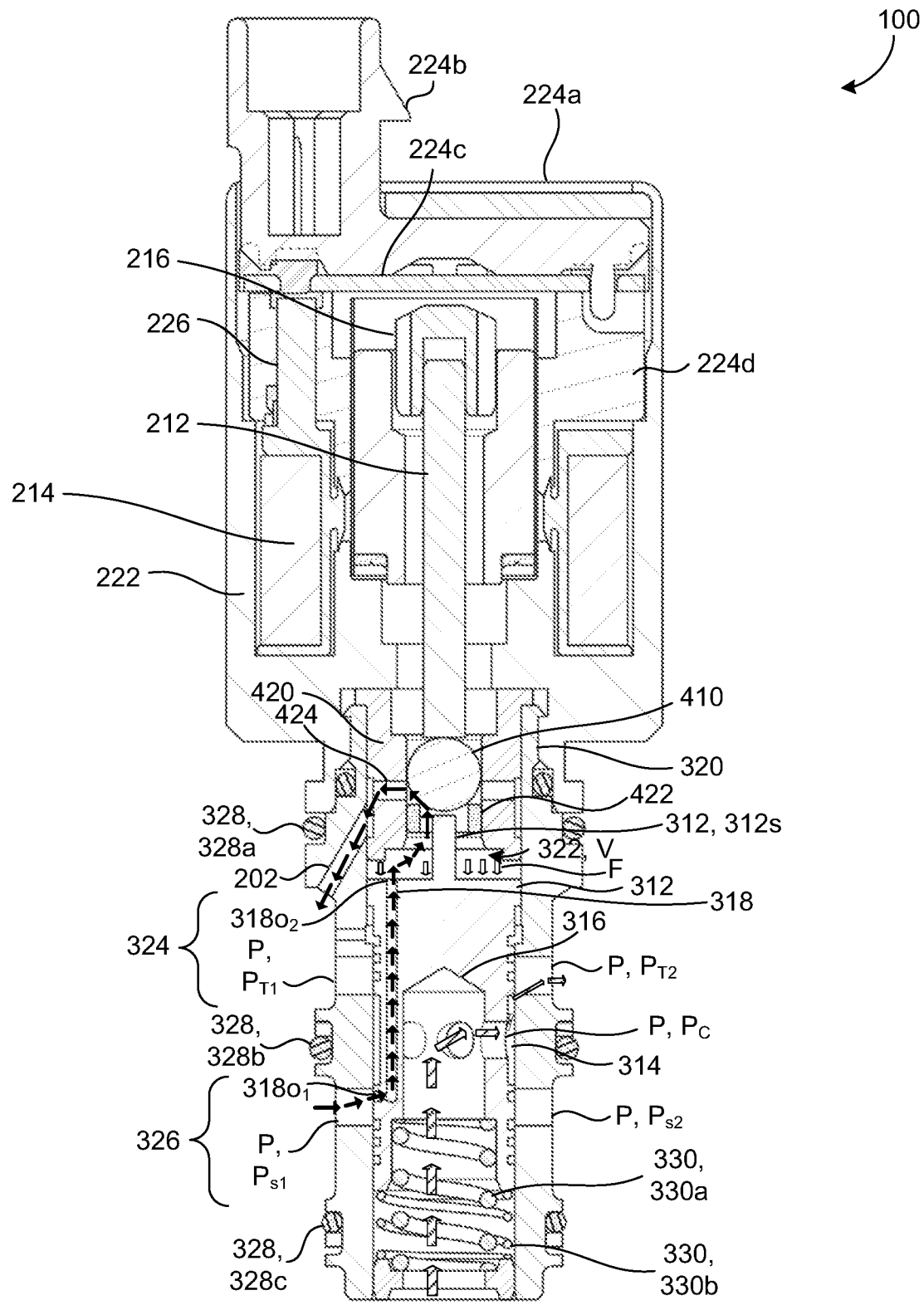
FIG. 2F is a cross sectional view of the example two stage valve of FIG. 2A in a pilot controlled state.

Referring to FIG. 2F, the two-stage valve 100 enters a modulation phase (or restricted flow phase $PH_2$) of the transition state $S_2$ as the solenoid 210 receives further command (e.g., receives more current from an electrical signal of the electrical input source 140). Here, the modulation phase $PH_2$ appears similar to FIG. 2E, but a slight extension of the solenoid pin 212 has driven the ball 410 further towards the seat 422 such that, although pilot hydraulic fluid may still flow from the pilot passage 318 to the fluid passageway 424 in the ball chamber 420 and out to the outlet line 202, pilot hydraulic fluid starts to significantly buildup hydraulic force F against the top surface of the body 312 of the spool 310 in the chamber cavity 322 of the spool sleeve 320 (e.g., as shown by the arrows at the top surface of the spool body 312). In this modulation phase PHz, the bottom surface of the ball 410 receives pressure from the hydraulic force F. Here, the hydraulic force F on the bottom surface of the ball 410 is part of a state of equilibrium with the force being applied to the ball 410 from the solenoid pin 212. Here, the hydraulic force F imparted against the spool 310 may be directly proportional to the force exerted by the solenoid pin 212. For instance, the force on the spool 310 may be represented by the following equation:

$$F_{spool,main} \cong \frac{A_{spool,main}}{A_{seat,ID}} (F_{solenoid}) \qquad (1)$$

where $A_{spool,main}$ is the surface area of the top surface of the body 312 of the spool 310, $A_{seat,ID}$ is the area of the seat 422 based on the inner diameter of the seat 422, and $F_{solenoid}$ is the force being applied by the solenoid pin 212.

In some examples, with the significant buildup of pilot hydraulic fluid pressure due to the reduced gap between the ball 410 and the seat 422, the hydraulic force F exerted on the spool 310 will move the body 312 of the spool 310 further and, thus, decouple the stem 312s of the spool 310 from its coupling with the mechanical link 400 (e.g., the ball 410). Once this decoupling occurs, the solenoid pin 212 is no longer able to impart an actuation force on the body 312 of the spool 310 and the hydraulic force F will control the movement of the spool 310. In the modulation phase $PH_2$, the position of the body 312 of the spool 310 may still align a small portion of the control port section 314 with the tank section 324 of the spool sleeve 320, but not with the supply section 326 of the spool sleeve 320. With this small fraction of alignment to the tank section 324, hydraulic fluid from the control element 130 may still return to the tank 120 using the fluid connection between the control port $P_C$ and the tank port $P_T$.

Figure 2G:
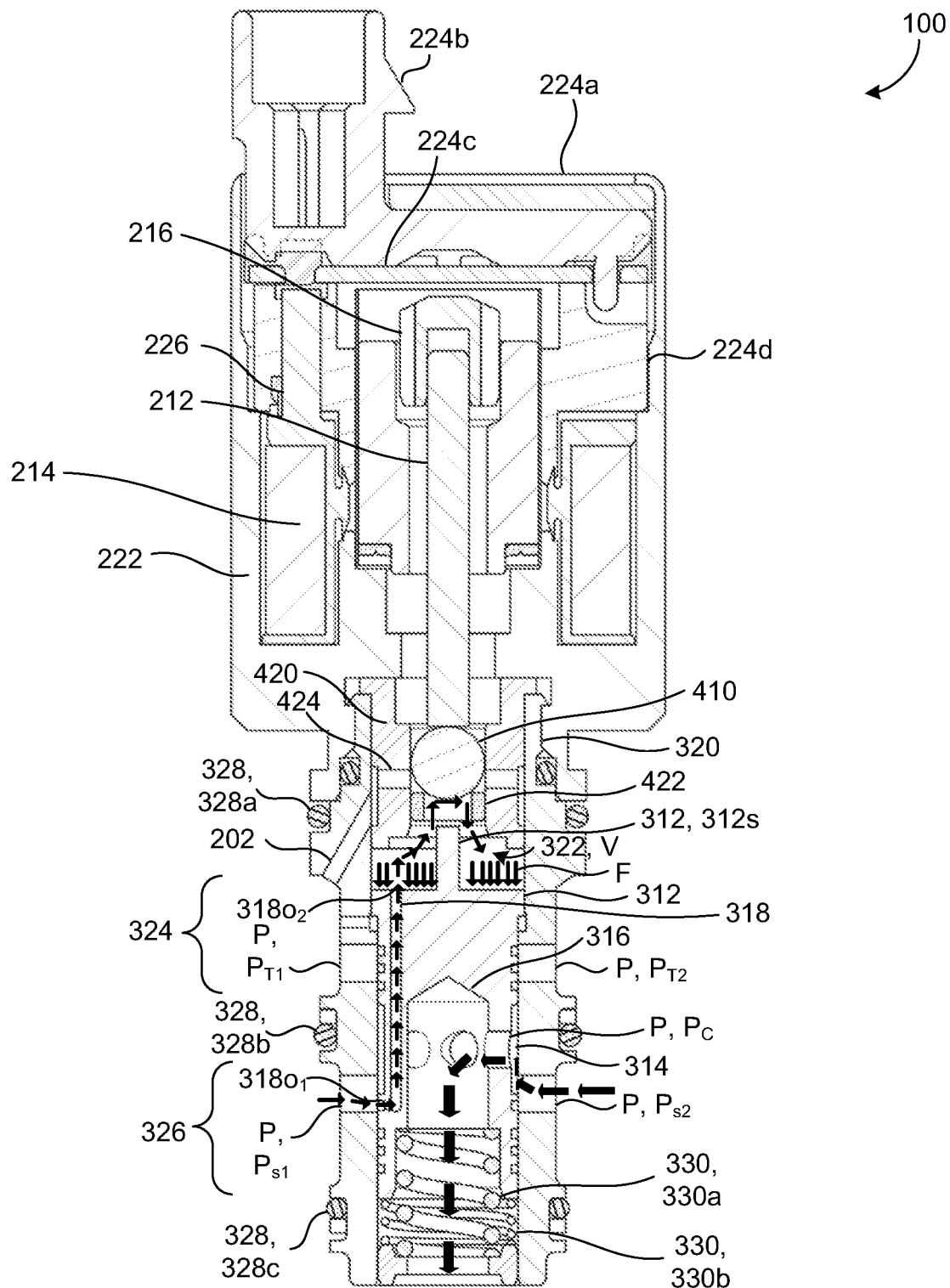
FIG. 2G is a cross sectional view of the example two-stage valve of FIG. 2A in an actuated state.

In FIG. 2G, the spool 310 has transitioned to the full actuated state (e.g., the third state $S_3$ of the main stage 300 and the third phase $PH_3$, or closed flow phase, of the pilot-operated stage 200 from FIGS. 1A and 1B). In the fully actuated state, the solenoid 210 has been commanded to its maximum state by the electrical input source 140. Here, the solenoid pin 212 has driven the ball 410 entirely into the seat 422; closing the passageway 424 to the outlet line 202 to the tank 120. For instance, the flow arrows corresponding to the pilot hydraulic fluid flow are no longer shown as traveling between the ball 410 and the seat 422. In this state, the source 110 supplies hydraulic fluid to the pilot passage 318. Without the exhaust or relief of pilot hydraulic pressure to the tank 120 (e.g., via the passageway 424 and the outlet line 202), the hydraulic force F from the pilot hydraulic fluid in the chamber cavity is responsible for all of the force on the spool 310. With the spool 310 driven to this fully actuated state, the control port section 314 of the body 312 of the spool 310 aligns with the supply section 326 of the spool sleeve 320. Due to such alignment, the source 110 is able to supply hydraulic fluid to the control element 130 using a fluid connection between the supply port $P_S$ and the control port $P_C$.

A number of implementations have been described. Nevertheless, it will be understood that various modifications may be made without departing from the spirit and scope of the disclosure. Accordingly, other implementations are within the scope of the following claims.

What is claimed is:

1. A valve comprising:
    a pilot-operated stage including a solenoid, wherein the solenoid includes a solenoid chamber housing a solenoid pin, and wherein, when the solenoid is energized, the solenoid actuates the solenoid pin;
    a main stage including a proportional spool housed within a spool sleeve, wherein the spool sleeve includes a supply section with at least one supply port in fluid communication with a hydraulic fluid supply source and a tank section with at least one tank port in fluid communication with a reservoir for the hydraulic fluid, wherein the proportional spool includes a spool body including a pilot fluid passage receiving hydraulic fluid from the supply source when an opening for the pilot fluid passage in the spool body aligns with the at least one supply port of the supply section, wherein, when the solenoid is de-energized, the opening for the pilot fluid passage is unable to fluidly communicate with the at least one supply port, and when the solenoid is energized and the opening for the pilot fluid passage in the spool body aligns with the at least one supply port of the supply section, hydraulic fluid from the supply source (i) applies a force to the spool body in a direction of actuation by the solenoid pin, and (ii) flows to a fluid passageway within the pilot-operated stage of the valve, and wherein the fluid passageway is in fluid communication with the reservoir for the hydraulic fluid.

2. The valve of claim 1, wherein the spool body comprises at least one working port along a central axis of the spool body.

3. The valve of claim 2, wherein the spool body includes a chamber along the central axis of the spool body, and wherein the chamber includes the at least one working port configured to selectively communicate between the at least one supply port of the supply section and the at least one tank port of the tank section.

4. The valve of claim 1, wherein the spool body includes a top surface facing the solenoid pin, and wherein, when the solenoid is energized and the opening for the pilot fluid passage in the spool body aligns with the at least one supply port of the supply section, hydraulic fluid from the supply source applies the force to the spool body against the top surface of the spool body.

5. The valve of claim 1, further comprising a mechanical linkage between the pilot-operated stage and the main stage, and wherein actuation of the solenoid pin couples the solenoid pin with the mechanical linkage to move the spool body within the spool sleeve.

6. The valve of claim 5, wherein the spool body moves within the spool sleeve in the direction of actuation in a first state and a second state, during the first state, the actuation of the solenoid pin drives the mechanical linkage into the spool body moving the spool body to a first position, and during the second state, the spool body decouples from the mechanical linkage and the force applied to the spool body by the hydraulic fluid flowing through the pilot fluid passage moves the spool body along the spool sleeve from the first position to a second position further away from the mechanical linkage.

7. The valve of claim 6, wherein the mechanical linkage comprises a flow restricting element.

8. The valve of claim 7, wherein the flow restricting element comprises a ball and an annular seat for the ball.

9. The valve of claim 8, wherein the spool body comprises a connecting rod having a diameter less than an inner diameter of the annular seat for the ball, and wherein, during the first state and the second state, hydraulic fluid flowing through the pilot fluid passage of the spool body fluidly communicates with the fluid passageway along a fluid pathway between the connecting rod and the annular seat, and wherein the hydraulic fluid applies a respective force to the ball to allow the hydraulic fluid to flow between the annular seat and the ball to the fluid passageway.

10. The valve of claim 8, further comprising a ball chamber housing the ball and the annular seat for the ball, and wherein the ball chamber includes at least one aperture at least partially defining the fluid passageway.

11. The valve of claim 1, wherein the tank section of the spool sleeve is at a location nearest the solenoid and the pilot fluid passage extends along a length of the spool body from a top surface of the spool body, and wherein a length of the pilot fluid passage is greater than a length of the tank section of the spool sleeve.

12. A first stage of a two-stage valve comprising:

a spool body including a pilot fluid passage;

a spool sleeve housing the spool body and including a supply section with at least one supply port in fluid communication with a hydraulic fluid supply source and a tank section with at least one tank port in fluid communication with a reservoir for the hydraulic fluid, wherein, an opening of the pilot fluid passage is unable to fluidly communicate with the tank section of the spool sleeve and, when the first stage is deactivated, the opening of the pilot fluid passage in the spool body is unable to fluidly communicate with the hydraulic fluid supply source, and wherein when the opening of the pilot fluid passage in the spool body aligns with the at least one supply port of the supply section, hydraulic fluid from the supply source flows through the pilot fluid passage to apply a driving force to the spool body to move the spool body along a length the spool sleeve in an actuation direction against a restoring force.

13. The first stage of the two-stage valve of claim 12, wherein the spool body includes at least one working port along a central axis of the spool body.

14. The first stage of the two-stage valve of claim 13, wherein the spool body includes a chamber along the central axis of the spool body, and wherein the chamber includes the at least one working port configured to selectively communicate between the at least one supply port of the supply section and the at least one tank port of the tank section.

15. The first stage of the two-stage valve of claim 12, wherein the spool body includes a bottom surface configured to receive the restoring force and a top surface opposite the bottom surface, and wherein, when the spool body moves along the length of the spool sleeve, a control volume within the spool sleeve increases in volume above the top surface of the spool body.

16. The first stage of the two-stage valve of claim 15, wherein the driving force applied by the hydraulic fluid from the pilot fluid passage increases in magnitude in proportion to an increase in the control volume above the top surface of the spool body.

17. The first stage of the two-stage valve of claim 12, wherein:

the spool body includes a bottom surface configured to receive the restoring force and a top surface opposite the bottom surface;

the spool body includes a chamber along a central axis of the spool body, wherein the chamber includes the at least one working port configured to selectively communicate between the at least one supply port of the supply section and the at least one tank port of the tank section; and an opening for the pilot fluid passage is located at a position along a length of the spool body closer to the bottom surface of the spool body than the at least one working port.

18. The first stage of the two-stage valve of claim 12, wherein:
the spool body includes a bottom surface configured to receive the restoring force and a top surface opposite the bottom surface;
the spool body includes a chamber along a central axis of the spool body, wherein the chamber includes the at least one working port configured to selectively communicate between the at least one supply port of the supply section and the at least one tank port of the tank section; and
a first distance between the at least one working port and the top surface is less than a second distance between an opening for the pilot fluid passage and the top surface.

19. The first stage of the two-stage valve of claim 12, wherein, when the pilot fluid passage in the spool body aligns with the at least one supply port of the supply section,
a first portion of the hydraulic fluid from the supply source flows through the pilot fluid passage to apply the driving force to the spool body, and
a second portion of the hydraulic fluid from the supply source flows through the pilot fluid passage and out of the spool sleeve to the reservoir.

20. The first stage of the two-stage valve of claim 19, wherein:
the spool body includes a bottom surface configured to receive the restoring force and a top surface opposite the bottom surface, and
when the spool body moves along the length of the spool sleeve, a control volume within the spool sleeve increases in volume above the top surface of the spool body and
in response to the increase in volume above the top surface of the spool body, the second portion of the hydraulic fluid from the supply source flowing through the pilot fluid passage and out of the spool sleeve to the reservoir reduces in volume.

21. The first stage of the two-stage valve of claim 12, wherein:
an activated position for the spool body corresponds to a position where at least one working port in the spool body aligns with the at least one supply port of the supply section; and
when the spool body moves along the length of the spool sleeve in the actuation direction to the activated position,
an opening of the pilot fluid passage aligns with the at least one supply port of the supply section prior to the at least one working port aligning with the at least one supply port of the supply section.

22. A valve comprising:
an energizable solenoid including a solenoid chamber housing a solenoid pin;
a proportional spool including a spool body and a spool sleeve, wherein the spool sleeve houses the spool body and includes a supply section with at least one supply port in fluid communication with a hydraulic fluid supply source and a tank section with at least one tank port in fluid communication with a reservoir for the hydraulic fluid, wherein the spool body includes a pilot fluid passage extending from a first opening to a second opening, and wherein the first opening faces the spool sleeve and the second opening faces the solenoid pin, and wherein the first opening is unable to fluidly communicate with the tank section of the spool sleeve;
a mechanical link coupling the solenoid pin to the spool body, and wherein the mechanical link at least partially includes a fluid passageway extending through the spool sleeve to the tank section; and
a flow path for hydraulic fluid from the supply source, wherein the flow path includes the pilot fluid passage and the fluid passageway, and
wherein, when the energizable solenoid is de-energized, the first opening of the pilot fluid passage is unable to fluidly communicate with the at least one supply port of the supply section.

23. The valve of claim 22, wherein the mechanical link further includes a ball and an annular seat having an inner diameter to receive the ball, and wherein the fluid passageway occurs between the ball and the annular seat.

24. The valve of claim 23, further comprising a control volume between the annular seat and a top surface of the spool body facing the solenoid pin.

25. The valve of claim 22, further comprising, a control volume between the mechanical link and a top surface of the spool body facing the solenoid pin, and
wherein, when (i) the first opening aligns with the at least one supply port of the supply section of the spool sleeve and (ii) actuation of the solenoid pin closes the fluid passageway, a volume of hydraulic fluid, supplied by the hydraulic fluid supply source through the pilot fluid passage, increases in the control volume.

26. The valve of claim 22, wherein the tank section of the spool sleeve is nearer to the mechanical link than the supply section of the spool sleeve.

* * * * *